United States Patent

[11] 3,580,603

| [72] | Inventors | Richard Chute<br>Huntington Woods, Mich.;<br>Charles O. Berryman, Madison, Wis. |
|---|---|---|
| [21] | Appl. No. | 746,131 |
| [22] | Filed | July 19, 1968 |
| [45] | Patented | May 25, 1971 |
| [73] | Assignee | Eaton Yale & Towne Inc.<br>Cleveland, Ohio |

[54] INFLATABLE SAFETY APPARATUS
27 Claims, 10 Drawing Figs.

[52] U.S. Cl. .................................................. 280/150, 280/87
[51] Int. Cl. ...................................................... B60r 21/08
[50] Field of Search ........................................... 280/150, 87; 180/78; 244/31

[56] References Cited
UNITED STATES PATENTS

| 2,138,163 | 11/1938 | Harris | 180/78 |
| 2,622,690 | 12/1952 | Barenyi | 180/78 |
| 2,834,609 | 5/1958 | Bertrand | 280/150 |
| 2,842,372 | 7/1958 | D'Antini | 280/150UX |
| 2,899,214 | 8/1959 | D'Antini | 280/150X |
| 3,080,138 | 3/1963 | Church | 244/31 |
| 3,450,414 | 6/1969 | Kobori | 280/150 |
| 3,451,693 | 6/1969 | Carey | 280/150 |

FOREIGN PATENTS

| 609,624 | | Italy | 280/150 |

*Primary Examiner*—Kenneth H. Betts
*Attorney*—Yount, Flynn & Tarolli

ABSTRACT: An improved safety apparatus for protecting the driver of a vehicle includes a confinement mounted on the steering wheel and having a circular cone portion which engages the torso of the driver when the confinement is expanded to thereby restrain movement of the driver during a collision. The confinement is inflated from a collapsed condition to an expanded condition in such a manner as to engage the rim of the steering wheel with the confinement before engaging the torso of the driver with the conical portion of the confinement. After forward movement of the torso of the driver has been retarded by engagement with the confinement, the head of the driver engages the conical portion of the confinement.

PATENTED MAY 25 1971 3,580,603

INVENTORS
RICHARD CHUTE
CHARLES O. BERRYMAN
BY
Yount, Flynn & Tarolli
ATTORNEYS

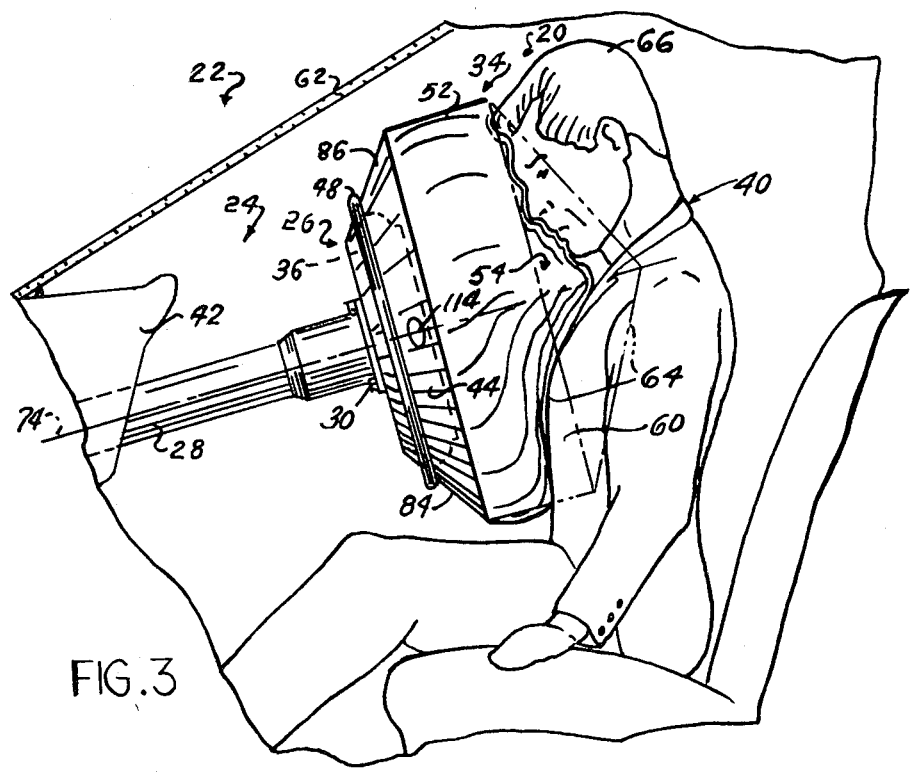
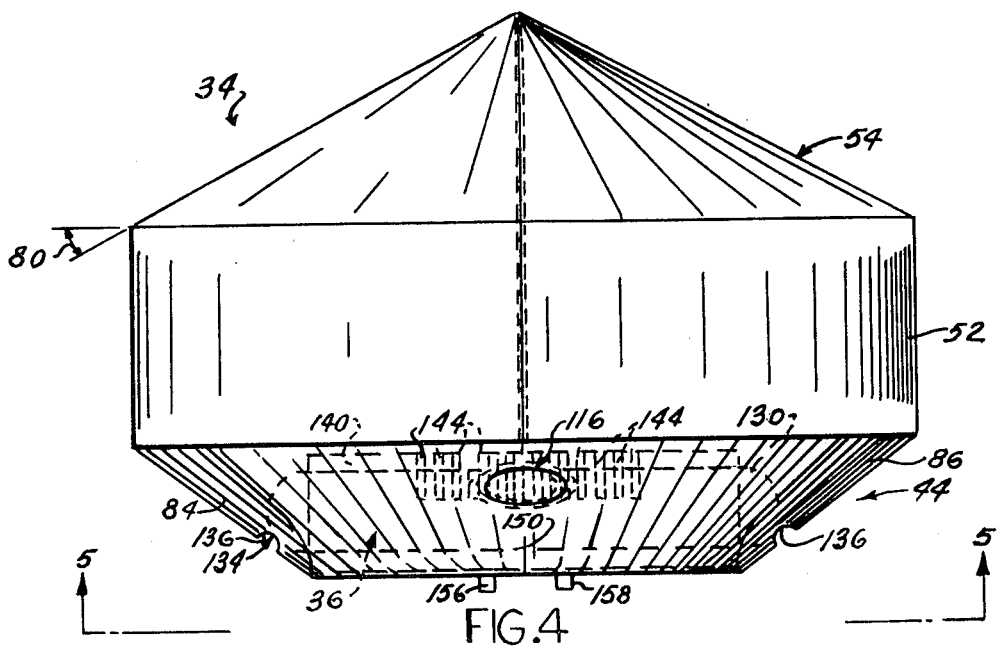

PATENTED MAY 25 1971 3,580,603

INVENTORS
RICHARD CHUTE
CHARLES O. BERRYMAN
BY
Young, Flynn & Tarolli
ATTORNEYS

INVENTORS
RICHARD CHUTE
CHARLES O. BERRYMAN
BY
Yount, Flynn & Tarolli
ATTORNEYS 3,580,603

INFLATABLE SAFETY APPARATUS

The present invention relates to a safety apparatus for protecting the driver of a vehicle during a collision, and particularly relates to a safety apparatus which includes a confinement which is inflated to a position between the steering wheel and the driver.

It is an object of this invention to provide a new and improved safety apparatus including a confinement which, upon the occurrence of a collision, is expanded into engagement with the rim of the steering wheel of a vehicle and into position for engagement with the torso of the driver to restrain movement of the driver.

Another object of this invention is to provide a new and improved safety apparatus for protecting the driver of a vehicle including a confinement and means for effecting expansion of the confinement from a collapsed condition to an expanded condition wherein the confinement is located between the driver and the steering wheel of the vehicle to restrain movement of the driver during a collision, the confinement being expanded into engagement with the rim of the steering wheel and then into engagement with the torso of the driver to thereby position the confinement and minimize any tendency of the driver to push the confinement aside and at the same time to minimize the possibility of injury due to relative movement between the head and torso of the driver.

Another object of this invention is to provide a new and improved safety apparatus for protecting the driver of a vehicle including a confinement which is inflatable to an expanded condition between the steering wheel of the vehicle and the driver to restrain movement of the driver resulting from a collision wherein the expanded confinement includes a circular cone portion which is adapted to be engaged by both the torso and head of the driver to thereby protect the driver.

Another object of this invention is to provide a new and improved safety apparatus for protecting the driver of a vehicle including a confinement adapted to be mounted on the steering wheel of a vehicle and inflated to an expanded condition in which a first portion of the confinement engages the torso of the driver and a second portion is located in a spaced-apart relationship with the head of the driver when the driver is in an upright position and is adapted to be engaged by the head of the driver when the torso of the driver is in a forward position to thereby restrain movement of the driver resulting from the collision.

Another object of this invention is to provide a new and improved safety apparatus in accordance with the preceding paragraph wherein the confinement has a conical portion with its central axis substantially coincident with the axis of rotation of the steering wheel and having an outer surface forming the first and second portions of the confinement which are engaged by the torso and head of the driver.

Another object of this invention is to provide a new and improved safety apparatus for protecting the driver of a vehicle, the safety apparatus including a confinement having a collapsed condition and an expanded condition in which the confinement is effective to restrain movement of the driver, means for supporting the confinement in the collapsed condition adjacent to the steering wheel of the vehicle and means for providing a flow of fluid to inflate the confinement to the expanded condition, wherein the means for providing the flow of fluid includes a reservoir supported on the steering column housing and a passage means formed between a steering shaft member and the steering column housing for conducting fluid from the reservoir to the confinement.

These and other objects and features of the invention will become more apparent upon consideration of the following description taken in connection with the accompanying drawings wherein:

FIG. 3 is a schematic elevational view, similar to FIGS. 1 and 2, illustrating the position of the driver a short time after the collision, the steering wheel being shown in a position rotated 90° from the position of FIG. 1;

FIG. 4 is an elevational view, on an enlarged scale, of a confinement forming a part of the safety apparatus of FIG. 1;

The present invention provides a new and improved vehicle safety apparatus for protecting the driver of a vehicle during collision. The safety apparatus includes a confinement which is mounted on a steering wheel of the vehicle and is inflated from a collapsed condition to an expanded condition in which the confinement restrains movement of the driver of the vehicle. An inflation assembly is provided for inflating the confinement in such a manner as to engage the rim of the steering wheel before the confinement engages the driver. The confinement includes a circular cone or conical portion which is engaged on one side by the torso of the driver and on the opposite side by the head of the driver to thereby restrict movement of the driver during a collision.

Figure 1:
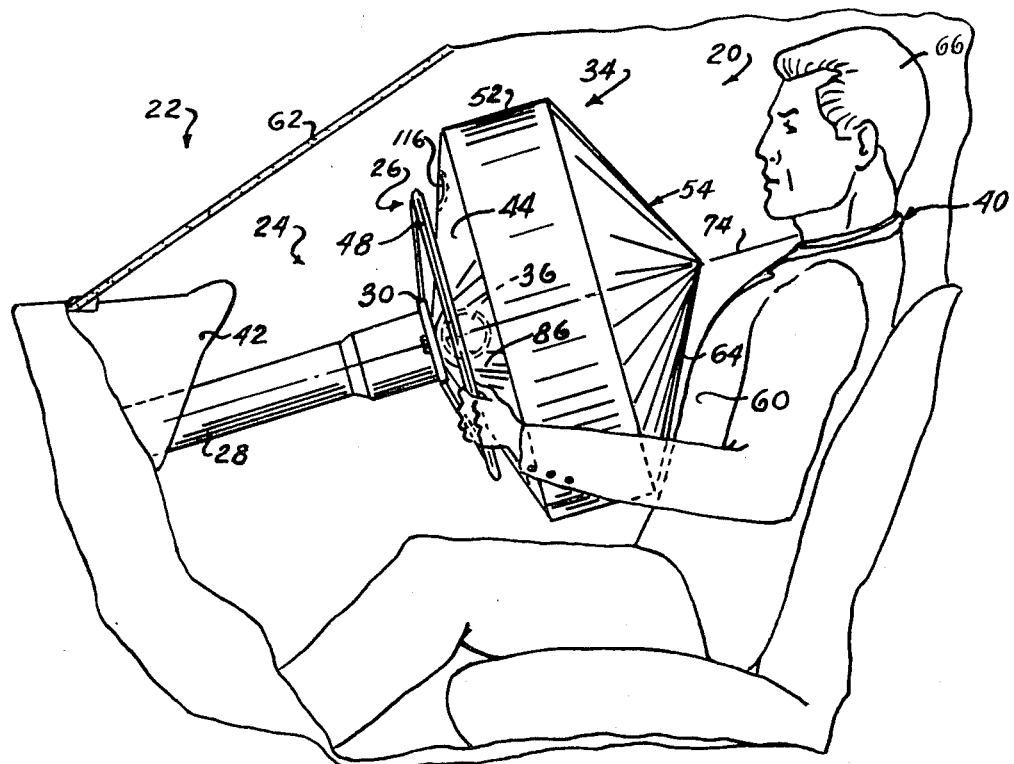
FIG. 1 is a schematic elevational view showing a safety apparatus forming a preferred embodiment of the invention in an expanded condition and in association with the steering wheel of a vehicle.

Although safety apparatus constructed in accordance with the present invention can be utilized to protect operators of many different types of vehicles, such as trucks and aircraft, the safety apparatus 20 is illustrated in FIG. 1 in connection with an automotive vehicle 22. The automotive vehicle 22 has a steering apparatus 24 including a steering wheel 26 mounted for rotation in a well-known manner relative to a steering column 28. The safety apparatus 20 is normally mounted in a contracted or uninflated condition (not shown) on a central portion 30 of the steering wheel 26. While it has been found to be particularly advantageous to mount the safety apparatus in the contracted condition on a central portion 30 of the steering wheel 26, it is contemplated that in certain environments it may be advantageous to mount the safety apparatus 20 immediately adjacent to the steering wheel. Upon occurrence of a collision, a confinement 34 of the safety apparatus 20 is inflated by an inflation assembly 36 (see FIGS. 1 and 4) from the collapsed or contracted condition to the illustrated expanded condition.

When the confinement 34 is in the expanded condition, the confinement is located between the steering wheel 26 and a driver, indicated at 40 in FIG. 1, to restrain movement of the driver during a collision to thereby protect the driver against injury by being impelled forwardly against the steering apparatus 24 or dashboard 42. To this end, the confinement 34 includes a base portion 44 which engages the center portion 30 and rim 48 of the steering wheel 26 when the confinement is in the expanded condition of FIG. 1. Extending axially outwardly from the base portion 44 is a cylindrical portion 52 which is connected to a right circular cone portion 54. Upon the occurrence of a collision, the inflation assembly 36 expands the confinement radially and axially outwardly from the contracted condition so that the base portion 44 of the confinement engages and projects radially beyond the rim 48 of the steering wheel 26. The cylindrical portion 52 of the confinement is then expanded axially outwardly and finally the conical portion 54 is brought into engagement with the torso 60 of the driver 40. The confinement 34 is then located between the driver 40 and the steering wheel 26 to protect the driver against engagement with the steering wheel and the steering column 28 during a front-end collision.

The base portion 44 of the confinement 34 is expanded into engagement with the rim 48 of the steering wheel 26 before the conical portion 54 of the confinement engages the torso 60 of the driver. This order of inflation prevents the driver from overriding or otherwise pushing the confinement out of its normal expanded position before the confinement is fully expanded. Since the confinement is in a substantially expanded condition when it engages the torso of the driver, fluid within the confinement can transmit reaction forces, due to engagement of the driver 40 with the confinement, to the steering wheel 26 and steering column 28. In addition, by having the confinement 34 in a substantially expanded condition before it engages the torso of the driver, the driver is protected against injury by a blowing of the unexpanded confinement into engagement with his torso under the influence of the fluid flowing from the inflation assembly 36. If the driver moved into engagement with the confinement 34 before it was fully expanded, the driver 40 might shove or push the confinement to one side and be injured by engagement with the steering wheel 26 or windshield 62.

Figure 2:
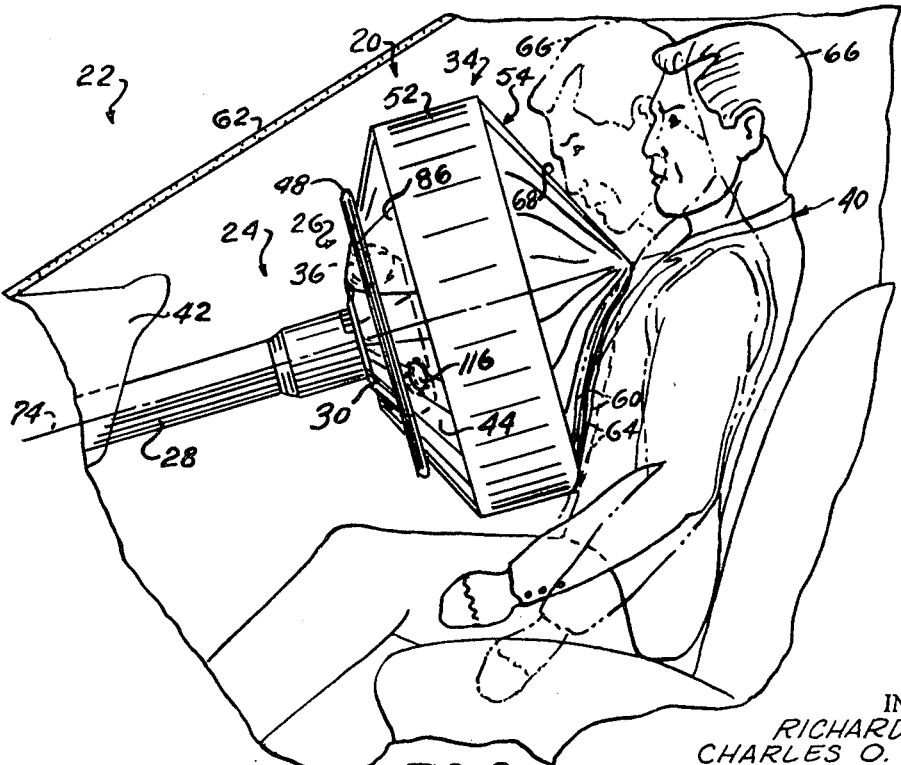
FIG. 2 is a schematic elevational view, similar to FIG. 1, illustrating the movement of a driver of a vehicle immediately after the occurrence of a collision, the steering wheel being shown in a position rotated 45° from the position of FIG. 1.

Assuming that a front-end collision has occurred and that the confinement is in the expanded condition of FIG. 1, the torso 60 of the driver 40 will move forwardly from the normal upright position of FIG. 1 into engagement with a section 64 of the outer surface of the conical portion 54. This engagement of the torso 60 with the conical portion 54 retards forward motion of the torso 60 while the head 66 of the driver is free to continue its forward movement. Therefore, while the torso 60 of the driver is moving through a relatively short distance, that is, from the position shown in solid lines in FIG. 2 to the position shown in dash lines in FIG. 2, the head 66 of the driver moves forwardly through a relatively large distance, to the position indicated in dash lines in FIG. 2. This forward movement of the head 66 of the driver relative to his torso positions the face of the driver immediately adjacent to a section 68 of the outer surface of the conical portion 54 which is opposite from the section 64 engaged by the torso. The forward motion of both the head 66 of the driver and the torso 60 is then retarded by the confinement 34 (see FIG. 3).

It should be noted that the surface section 68 of the confinement which is engaged by the head 66 of the driver is initially spaced apart from the head, as shown in FIG. 1. Therefore, the driver's head 66 moves from a position in substantial alignment with the torso 60 to a position forwardly of the torso before the head engages the confinement 34. This is important since the head 66 has a relatively light weight per unit of surface area compared to the torso 60 so that the confinement 34 exerts a greater restraining effect on the torso 60 than on the head 66. If the head and torso of the driver 40 were moved into engagement with the confinement at the same time and while in substantial alignment, the heavy torso 60 of the driver would move forwardly of the relatively light head 66 and the neck of the driver might be severely injured, or even broken, by the resulting backward movement of the head relative to the torso. By allowing the head 66 to move forwardly of the torso 60 before the head engages the confinement, the subsequent relative movement between the head and torso tends to bring them into alignment without injuring the neck of the driver.

The confinement 34 is mounted on the rotatable steering wheel 26 with the central axis of the confinement, indicated at 74, coincident with the axis of rotation of the steering wheel 26 and the central axis of the steering column 28 when the confinement is in the expanded condition. Since the central axis of the conical portion 54 is coincident with the axis of rotation of the steering wheel 26, the outer surface of the circular conical portion 54 is in the same relationship with the driver 40 regardless of the position to which the steering wheel 26 is rotated. This is most clearly seen by comparison of FIGS. 1—3 wherein the steering wheel is shown rotated in 45° increments, in a generally clockwise direction, as viewed by the driver 40, from the position of FIG. 1 to the position of FIG. 3. Since the circular conical portion 54 is symmetrical relative to its central axis and the axis of rotation of the steering wheel 26, the confinement 34 always has the same relationship relative to the driver 40 before the driver engages the confinement. If a central axis of a conical portion 54 was not coincident with the axis of rotation of the steering wheel 26, the position of the confinement relative to the driver 40 would vary depending upon the angle to which the confinement and steering wheel was rotated by the driver. In addition, the confinement 34 is always positioned with the outer surface section 64 extending generally parallel to the torso 60 of the driver. This generally parallel relationship between the surface section 64 and the torso 60 of the driver is provided by making the angle of inclination of the steering column, that is the angle which the axis 74 makes with a horizontally extending plane, equal to the angle included between the base of the confinement 54 and the outer surface of the confinement, that is the angle indicated at 80 in FIG. 4. Of course, when the confinement 34 is expanded, fluid pressure within the confinement bulges the sides of the confinement outwardly so that conical portion 54 is only generally conical and is not a precise cone and the cylindrical portion 52 is only generally cylindrical in shape.

To provide support for the expanded confinement 34 and to protect the driver from engagement with the steering wheel 26, the base portion 44 of the confinement is generally circular in cross section (see FIG. 5) and a diameter which is greater than the diameter of the steering wheel 26. Therefore, the base portion projects radially outwardly of the steering wheel and applies reaction forces against the steering wheel when the torso 60 of the driver engages the confinement 34. In addition, the base portion 44 of the confinement has a concave dish-shaped configuration (see FIG. 4) for holding the inflation assembly 36.

The inflation assembly 36 extends diametrically of the base portion 44 and is positioned in an axially outwardly projecting trough or bulge portion which is located between opposite reinforcing wedges 84 and 86 (FIG. 4) which extend axially outwardly and radially inwardly from the cylindrical portion 52 of the confinement. As is perhaps best seen by comparison of FIGS. 5 and 6, the base portion 44 is provided with a circular cross section by forming it from a sheet 90 having two arcuate portions 92 and 94 with their centers at 96 and 98 respectively. The arcuate portions 92 and 94 are interconnected by a central portion 100.

Figure 5:
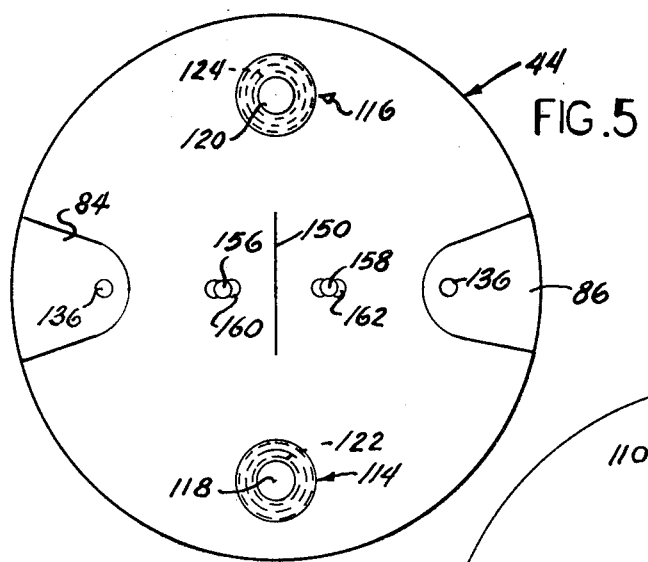
FIG. 5 is a plan view, taken on a reduced scale along line 5-5 of FIG. 4, further illustrating the structure of the confinement.
Figure 6:
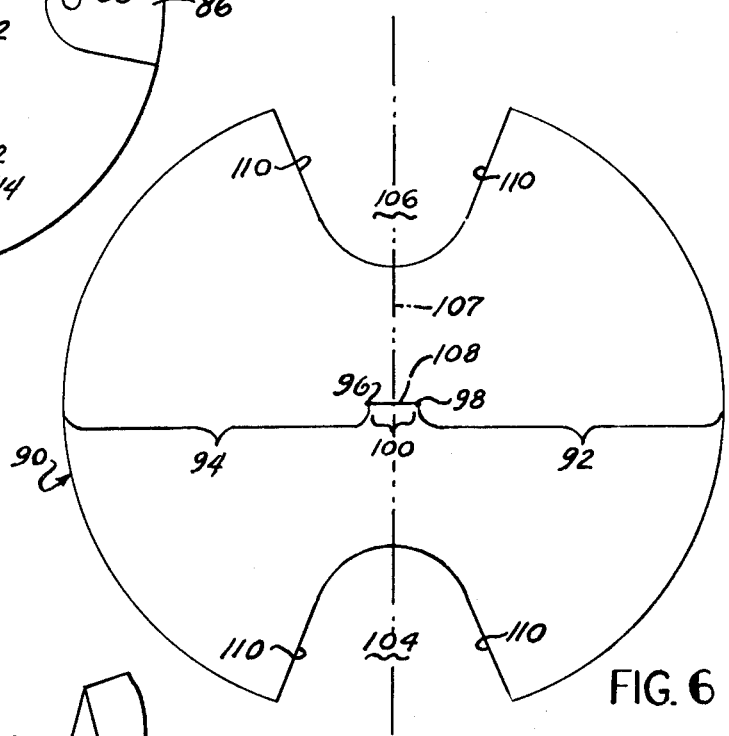
FIG. 6 is a plan view of a sheet of material used in forming the base portion of the confinement.

A pair of generally wedge-shaped recesses 104 and 106 are formed on opposite sides of the sheet 90 along a centerline 107 extending perpendicular to a line 108 interconnecting the centers 96 and 98. The recesses 104 and 106 have straight sides 110 which lie along radii of an intersection between the centerline 107 and the line 108 interconnecting the centers 96 and 98. The base 40 is assembled by bringing the side surfaces 110 toward each other and sewing the wedges 84 and 86 to the sheet 90 to block the recesses 104 and 106, as shown in FIG. 5. This manner of fabricating the base 44 results in a generally circular base with the edges of the reinforcing wedges 84 and 86 lying along arcs of a great circle of a sphere having a radius equal to the maximum radius of the base portion 44. The generally circular upper-edge portion of the base 44 can then be readily connected to the cylindrical portion 52 of the confinement 34. By experimentation, it has been determined that this manner of constructing the base portion 44 tends to minimize stress concentrations and failures at the reinforcing wedges 84 and 86.

To reduce rebound of the driver 40 upon engagement with the confinement 34, a pair of pressure responsive devices or blowout assemblies 114 and 116 are provided in the base portion 44 of the confinement 34. The blowout assemblies 114 and 116 include generally circular patches or sections 118 and 120 which are located inside of the confinement and block generally circular orifices 122 and 124. When a predetermined pressure is present within the confinement 34, the blowout patches 118 and 120 are torn loose from stitching securing them to the base of the confinement and fluid can then flow out of the confinement through the orifices 122 and 124. This outward flow of fluid results in a decrease of the pressure within the confinement and a deflation of the confinement to thereby absorbe energy and minimize rebound of the occupant from the confinement. The operation of the blowout patch assemblies 114 and 116 is described more fully in copending application, Ser. No. 621,846 filed Mar. 9, 1967 (now abandoned) of common ownership with the present application.

The inflation assembly 36 includes a reservoir, indicated at 130 in FIG. 4, for holding the fluid under pressure. Upon the occurrence of the collision, an explosive charge associated with the reservoir 130 is detonated, by means of an electrical current conducted by wires 134 which extend through two apertures 136 located at opposite ends of a reservoir 130, to rupture or break open the reservoir. High-pressure fluid then flows out of the reservoir 130 axially along a diffuser 140 having a plurality of slots 144. The slots 144 direct the flow of fluid to expand the confinement 34 into engagement with the rim 48 of the steering wheel 26 before the confinement engages the torso 60 of the driver 40. The apertures 134 and 136 are relatively small in cross section so that a relatively small amount of fluid flows therethrough during the expansion of the confinement 34. Therefore, the apertures 134 and 136 can be left open, as shown in FIG. 4, or they can be sealed in any suitable manner.

A slit 150 is formed in the base portion 44 along the line 108 extending through the centers 96 and 98 to provide access to the interior of the confinement. During the assembly of the safety apparatus 20, the inflation assembly 36 is inserted in an endwise orientation through the slit 150 and then rotated to the position shown in FIG. 4. A pair of studs or bolts 156 and 158 are then inserted through apertures 160 and 162 to mount the safely apparatus 20 in a collapsed condition on the steering wheel 26. The outwardly projecting bolts 156 and 158 and the diffuser 140 bridge the slit 150 and hold the slit in the closed position of FIG. 4 by clamping the material on both sides of the slit against the steering wheel 26.

Figure 7:
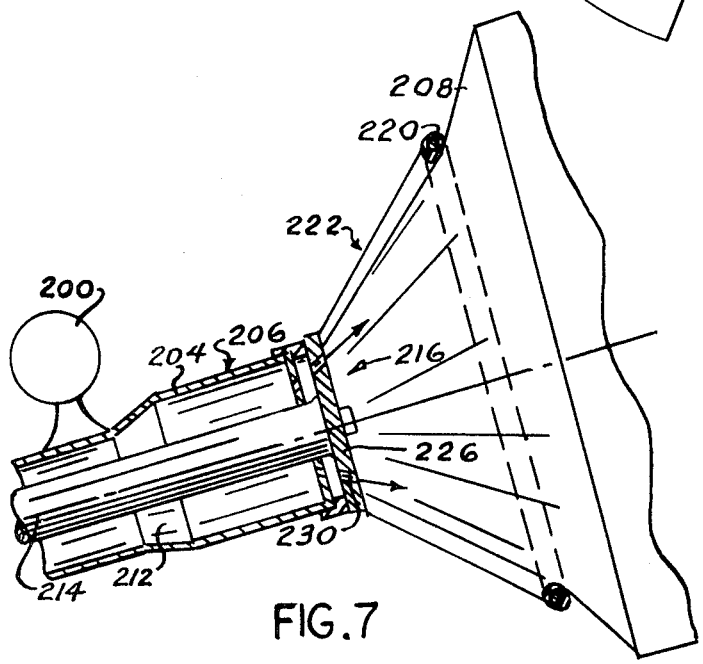
FIG. 7 is a schematic sectional view illustrating an embodiment of the invention wherein a reservoir for supplying fluid to inflate the confinement is mounted on a steering column housing.

The structure of some steering wheels in such as to make the mounting of the inflation assembly 36 on the steering wheel relatively difficult. This difficulty is overcome by the embodiment of the invention shown in FIG. 7 wherein a fluid reservoir 200 is mounted on a housing 204 of a steering column 206 for suppling fluid to inflate a confinement 208, similar to the confinement 34 of FIGS. 1—6, from a contracted condition (not shown) to an expanded condition. The reservoir 200 is connected in fluid communication with the confinement 208 by an annular passage 212 formed between a steering shaft member 214 and the housing 204. The passage 212 terminates at a diffuser assembly 216 which directs the flow of fluid from the passage into the confinement 208 in such a manner as to expand the confinement radially and axially outwardly into engagement with the rim 220 of a steering wheel 222 which is fixedly connected to the shaft 214 for rotation therewith. The diffuser assembly 216 includes a plate 226 mounted for rotation with the steering wheel 222 and having a plurality of slots 230 formed therein for directing the flow of fluid. Of course, the end of the passage 212 which is spaced axially from the steering wheel 216 is sealed in a suitable manner so that the majority of the fluid from the reservoir 200 flows through the passage 212 and diffuser assembly 216 into the confinement 208.

Figure 8:
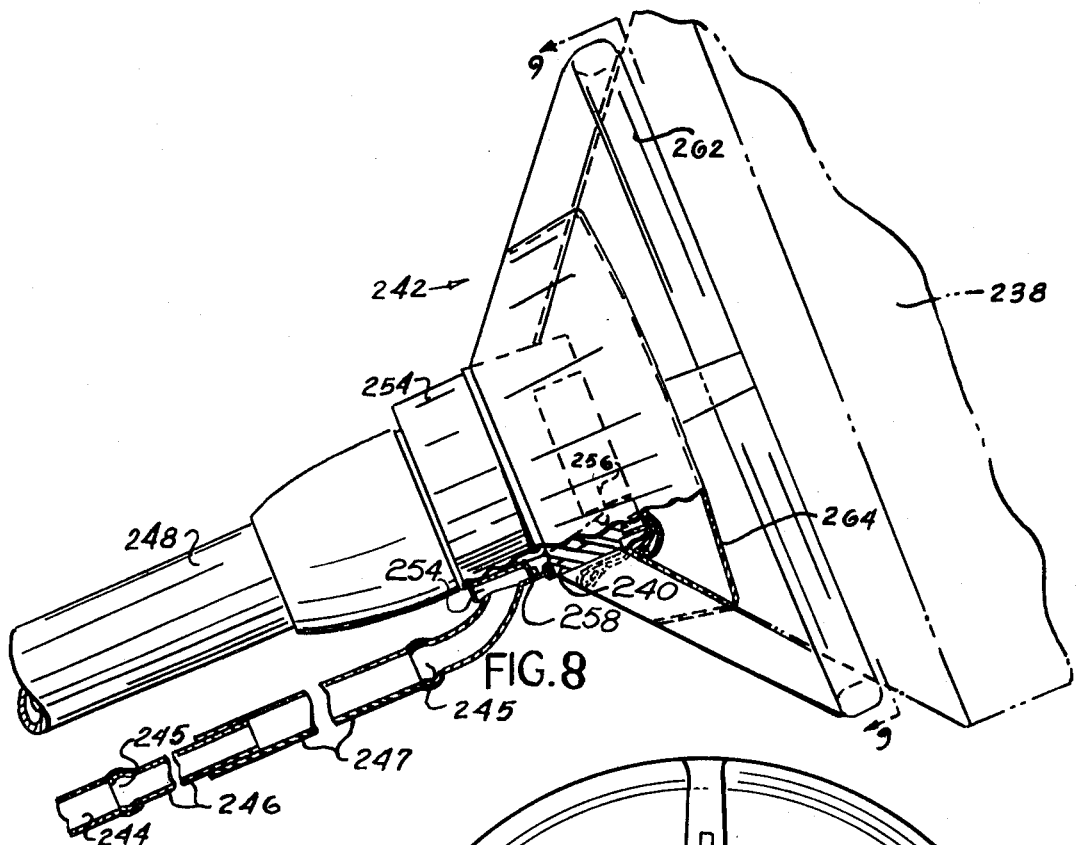
FIG. 8 is a schematic fragmentary sectional view of another embodiment of the invention wherein the confinement is inflated by fluid conducted from a remote reservoir by a passage extending along the outside of the steering column housing.
Figure 9:
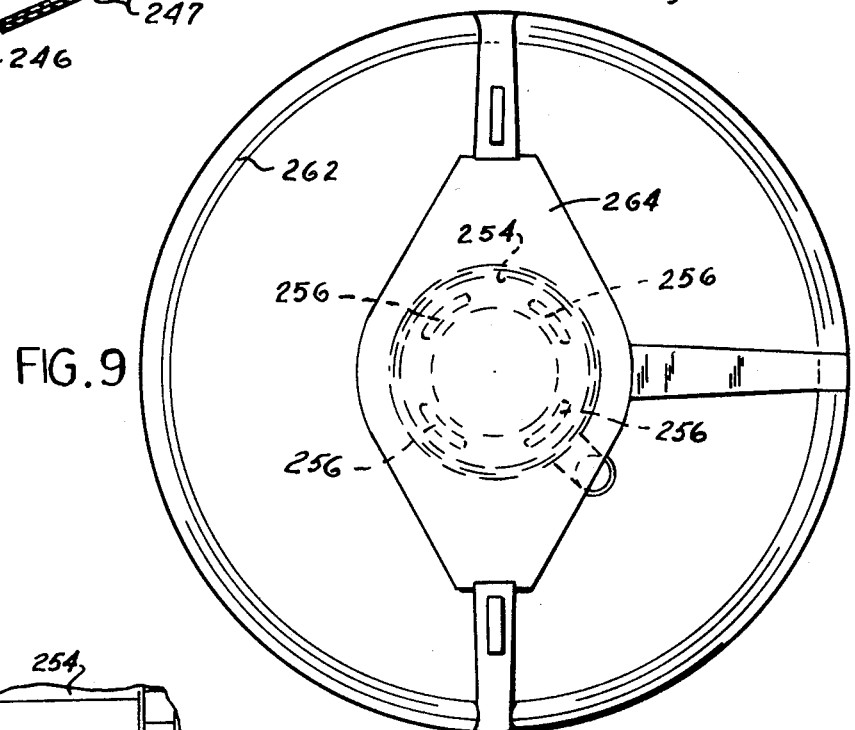
FIG. 9 is a plan view, taken along the line 9-9 of FIG. 8, with the confinement in a collapsed condition and enclosed by a cover on the steering wheel.
Figure 10:
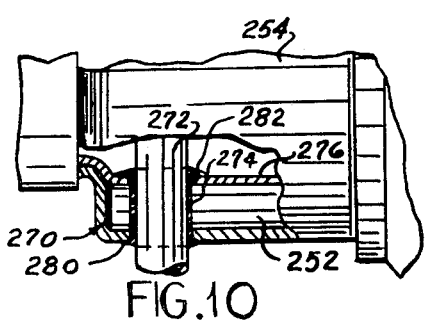
FIG. 10 is a fragmentary sectional view, on an enlarged scale, illustrating the structure of a turn signal lever seal assembly.

Another embodiment of the invention, wherein a confinement 238 in inflated from a collapsed condition to an expanded condition by fluid conducted form a remotely located reservoir, is illustrated in FIGS. 8—10. The confinement 238 is expanded from the collapsed condition (shown in solid lines in FIG. 8) adjacent to the center portion 240 of the steering wheel 242 by fluid conducted form a reservoir (not shown) through a fluid conduit passage 244 which extends generally parallel to the longitudinal axis of the steering column 248. The passage 244 includes a plurality of pivotal ball-and-socket-type joints 245 which enable the passage 244 to move with a tiltable steering wheel. TIn addition, the passage 244 includes a pair of sections 246, 247 which are interconnected in a telescopic relationship to adapt the passage for use with a collapsible steering column. Upon a collapsing of the steering column, the telescopic relationship of the sections 246, 247 merely increases.

Upon the occurrence of a collision, fluid flows under pressure through the passage 244 to an annular manifold chamber 252 formed by the steering column housing 254 immediately adjacent to the center portion 240 of the steering wheel 242. A plurality of passages 256, formed in the center portion 240 of the steering wheel 242, are connected in fluid communication with the manifold chamber 252 by holes or apertures 258. Thus, upon the occurrence of a collision, the confinement 238 is inflated from the collapsed condition, shown in solid lines in FIG. 8, to the expanded condition, shown in dash lines in FIG. 8, by fluid conducted from a remotely mounted reservoir through the passage 244 to the chamber 252. The fluid flows from the chamber 252 through passages 256 in the center portion 240 of the steering wheel 242 and into the confinement 238.

The passages 256 functions as a diffuser to direct the flow of fluid to expand the confinement 238 into engagement with the rim 262 of the steering wheel 242, in the manner previously explained, before the confinement 238 engages the torso of the driver. As the confinement 238 is inflated from the collapsed condition of FIG. 8 to the expanded condition, a protective cover 264 is forced to one side and the flow of fluid, under the influence of the passages 256, inflates the confinement to a substantially expanded condition before the confinement engages the torso of the driver. It should be noted that the passage 256 rotate with the steering wheel 242 relative to the annular manifold chamber 252 so that the passages are always in the same relationship with the confinement 238 for all positions of the steering wheel. Thus, the confinement 238 is expanded in the same manner regardless of the position to which the steering wheel 242 happens to be rotated upon the occurrence of a collision.

Most automotive vehicles include a combination turn signal lever and hazard switch which extends outwardly from the steering column 248 at a location adjacent to the central portion 240 of the steering wheel. A seal assembly 270 (see FIG. 10) is provided for preventing escape of fluid from the manifold chamber 252 around the turn signal lever, indicated at 272 in FIG. 10. The seal assembly 270 includes a body section 274 which extends between the steering column housing 254 and an inner partition 276 between which the manifold chamber 252 is located. The body section 274 of the seal assembly 270 is connected to flanged outer portions 280, 282 which sealingly engage the steering column housing 254 and the inner partition 276, respectively. Thus, it can be seen that the seal assembly 270 seals the aperture in the steering column housing 254 through which the turn signal lever 272 extends to prevent an escape of fluid from the manifold chamber 252 around the turn signal lever.

In view of the foregoing remarks, it can be seen that the safety apparatus 20 includes a confinement 34 and an inflation assembly for expanding the confinement from a contracted condition to an expanded condition. In the embodiment of FIGS. 1—7, the inflation assembly 36 includes a diffuser 140 which directs a flow of fluid from a reservoir 132 in such a manner as to inflate the base 44 of the confinement into engagement with the rim 48 of the steering wheel 26 before the conical portion 54 of the confinement engages the torso 60 of the occupant 40. During a collision, the forward movement of the torso 60 is retarded by engagement with the surface of the conical portion 54. The head 66 of the occupant 40 then moves forwardly of the torso 60 and engages the surface of the conical portion 54 and the forward movement of the head 66 is then retarded by the confinement 34. This sequence of engagement of the torso 60 and head 66 of the driver 40 with the confinement results in the forward movement of the relatively heavy torso 60 being retarded before the forward movement of the head 66 is retarded and thereby reduces the possibility of injuries to the neck of the driver by a rearward bending of the head 66 relative to the torso 60 under the influence of the confinement.

Having described our invention, we claim:

1. Safety apparatus for protecting a driver of a vehicle having a rotatable steering wheel with an outer rim adapted to be manually grasped and rotated by a driver of the vehicle, said safety apparatus comprising a confinement having a collapsed condition and an expanded condition, said confinement in said expanded condition being effective to engage the driver's torso to restrain movement of the driver during a collision, means for supporting said confinement in said collapsed condition for rotation with the steering wheel of the vehicle, and means for providing a flow of fluid to effect expansion of said confinement into engagement with the rim of the steering wheel and then into engagement with the torso of the driver, said confinement in said expanded condition having a symmetrical configuration with respect to an axis of rotation of the steering wheel whereby said confinement has the same relationship relative to the driver and steering wheel upon operation of said confinement to the expanded condition with the steering wheel in any one of a plurality of rotational positions relative to the driver of the vehicle.

2. Safety apparatus for protecting a driver of a vehicle having a steering wheel, said apparatus comprising a confinement means having a collapsed condition and an expanded condition, said confinement means in said expanded condition being located between the driver and the steering wheel of the vehicle and having a base portion adapted to engage the steering wheel and a circular conical portion adapted to be engaged by the torso of the driver of the vehicle and by the head of the driver of the vehicle to thereby restrain movement of the driver in a collision, and means or providing a flow of fluid to inflate said confinement means to said expanded condition, said means for providing a flow of fluid including flow-directing means for directing the flow of fluid to inflate said confinement means in such a manner as to substantially expand said confinement means before engagement occurs between said conical portion and the torso of the driver.

3. Safety apparatus as set forth in claim 2 wherein said confinement means further includes a cylindrical portion interconnecting said base portion and said conical portion, said cylindrical and conical portions of said confinement means being positioned relative to the steering wheel so as to have their central axes substantially coincident with an axis of rotation of the steering wheel.

4. Safety apparatus as set forth in claim 2 wherein said means for providing a flow of fluid includes reservoir means mounted on the steering column of the vehicle and connected in fluid communication with said confinement means and said means for directing the flow of fluid by a passage means extending longitudinally along the steering column of the vehicle.

5. Safety apparatus as set forth in claim 2 wherein an included angle between an outer surface of said conical portion and the base of said conical portion is approximately equal to the angle of elevation of the steering column of the vehicle.

6. Safety apparatus for protecting a driver of a vehicle having a steering wheel and a steering column housing, said safety apparatus comprising a confinement having a collapsed condition and an expanded condition, said confinement when in said expanded condition being effective to restrain movement of the driver during a collision, means supporting said confinement when in said collapsed condition immediately adjacent the steering wheel of the vehicle, and means for providing a flow of fluid to inflate said confinement from said collapsed condition to said expanded condition wherein said confinement is located between the steering wheel and the driver of the vehicle, said means for providing a flow of fluid including a reservoir containing a supply of fluid under pressure, an annular chamber formed by the steering column housing adjacent to a central portion of the steering wheel, passage means extending for a part of its length in a generally axial direction along the steering column housing and connecting said chamber in fluid communication with said reservoir for conducting fluid from said reservoir to said chamber, and a plurality of apertures formed in a central portion of said steering wheel for directing a flow of fluid from said chamber to effect substantial expansion of said confinement before said confinement engages the driver of the vehicle.

7. Safety apparatus for protecting a driver of a vehicle having steering means, said safety apparatus comprising a confinement having a collapsed condition and an expanded condition, said confinement in said expanded condition being effective to restrain movement of the driver during a collision, means for supporting said confinement in said collapsed condition adjacent to the steering means of the vehicle, and means for providing a flow of fluid to effect expansion of said confinement into engagement with a part of the steering means, said confinement including a portion having the general configuration of a circular cone having its vertex at a level lower than the head of the driver and its arcuate outer surface positioned for engagement with the torso of the driver when said confinement is in said expanded condition.

8. Safety apparatus as set forth in claim 7 wherein said steering means is rotatable and the included angle between the base and side of the conical portion is approximately equal to the angle of elevation of the steering column of the vehicle and the central axis of said confinement is coincident with the axis of rotation of the steering means to thereby maintain a portion of the outer surface of said conical portion in a generally parallel relationship with the torso of the driver for all positions of rotation of the steering means.

9. Safety apparatus as set forth in claim 7 wherein said confinement further includes a base portion which engages the part of the steering means and a generally cylindrical portion interconnecting said base portion and said conical portion.

10. Safety apparatus for protecting a driver of a vehicle having steering means, said safety apparatus comprising a confinement having a collapsed condition and an expanded condition, said confinement in said expanded condition being effective to restrain movement of the driver during a collision, means for supporting said confinement in said collapsed condition adjacent to the steering means of the vehicle, and means for providing a flow of fluid to effect expansion of said confinement into engagement with a part of the steering means, said confinement when in the expanded condition having a continuous arcuate outer surface in the general configuration of a circular cone with one portion adapted to be engaged by the torso of the driver and another portion adapted to be engaged by the head of the driver, said other portion of said surface being located in a spaced-apart relationship with the head of the driver and at a level which is lower than the head of the driver when said confinement is in said expanded condition and the driver is seated in an upright position in the vehicle.

11. Safety apparatus as set forth in claim 10 said confinement further includes pressure-responsive means for enabling fluid to flow out of said confinement when a predetermined pressure is present in said confinement.

12. Safety apparatus for protecting a driver of a vehicle having a steering wheel, said safety apparatus comprising a confinement adapted to be mounted on the steering wheel of the vehicle for rotation therewith and having a collapsed condition and an expanded condition in which said confinement engages at least a part of the rim of the steering wheel and is located between the steering wheel and the driver, said confinement having a first portion for engaging the torso of the driver of the vehicle when said confinement is in said expanded condition to restrain movement of the torso and a second portion extending at an angle to said first portion and located in such an orientation relative to the driver as to be spaced apart from the head of the driver when the driver is in an upright position and to be engaged by the head of the driver when the torso of the driver is in a forward position, said confinement including a conical portion having its central axis substantially coincident with the axis of rotation of the steering wheel and having an outer surface forming said first and second portions of said confinement, and means for providing a flow of fluid to effect expansion of said confinement.

13. Safety apparatus as set forth in claim 12 wherein said confinement further includes a base portion which engages the steering wheel and cylindrical portion interconnecting said base portion and said conical portion, said cylindrical portion having its central axis substantially coincident with the central axis of said conical portion and the axis of rotation of the steering wheel.

14. Safety apparatus as set forth in claim 12 wherein the included angle between the base and outer surface of said conical portion is approximately equal to the angle of elevation of the axis of rotation of the steering wheel to thereby locate the portion of the outer surface of said conical portion which is adjacent to the torso of the driver when said confinement is in said expanded condition in a generally parallel relationship with the torso of the driver.

15. Safety apparatus as set forth in claim 12 further including pressure-responsive means mounted on said confinement for enabling fluid to flow out of said confinement when a predetermined pressure is present in said confinement to thereby minimize rebound of the driver under the influence of fluid pressure within the confinement.

16. Safety apparatus for protecting a driver of a vehicle having a steering wheel, said safety apparatus comprising a confinement adapted to be mounted on the steering wheel of the vehicle for rotation therewith and having a collapsed condition and an expanded condition in which said confinement engages at least a part of the rim of the steering wheel and is located between the steering wheel and the driver, said confinement having a first portion for engaging the torso of the driver of the vehicle when said confinement is in said expanded condition to restrain movement of the torso and a second portion extending at an angle to said first portion and located in such an orientation relative to the driver as to be spaced apart from the head of the driver when the driver is in an upright position and to be engaged by the head of the driver when the torso of the driver is in a forward position, and means for providing a flow of fluid to effect expansion of said confinement, said means for providing a flow of fluid including a reservoir mounted in a spaced-apart relationship with the steering wheel, diffuser means associated with said steering wheel and having a plurality of apertures to direct a flow of fluid in such a manner as to inflate said confinement to a substantially expanded condition before said confinement engages the torso of the driver, and passage means extending between said reservoir and said diffuser means to connect said diffuser means in fluid communication with said reservoir.

17. Safety apparatus for protecting a driver of a vehicle having a steering wheel and steering shaft member connected with the steering wheel for rotation therewith and a steering column housing, said safety apparatus comprising a confinement having a collapsed condition and an expanded condition, means supporting said confinement when in said collapsed condition immediately adjacent the steering wheel of the vehicle, said confinement including a circular cone portion which is located with its central axis substantially coincident with the axis of rotation of the steering wheel when said confinement is in said expanded condition, said conical portion having an outer surface which is adapted for engagement with the torso of the driver of the vehicle to restrain movement of the driver during a collision, and means for providing a flow of fluid to inflate said confinement from said collapsed condition to said expanded condition wherein said confinement is located between the steering wheel and the driver of the vehicle, said means for providing a flow of fluid including a reservoir supported on the steering column housing of the vehicle and containing a supply of fluid under pressure, passage means formed between the steering shaft member and the steering column housing for connecting said reservoir in fluid communication with said confinement, flow-directing means for directing the flow of fluid to effect substantial expansion of said confinement before engagement occurs between said conical portion of said confinement and the torso of the driver of the vehicle.

18. Safety apparatus for protecting a driver of a vehicle having a rotatable steering wheel, said safety apparatus comprising a confinement adapted to be mounted on the steering wheel of the vehicle for rotation therewith and having a collapsed condition and an expanded condition in which said confinement engages at least a part of the rim of the steering wheel and is located between the steering wheel and the driver, said confinement including a first portion disposed on a lower side of the axis of rotation of the steering wheel for engaging the torso of the driver of the vehicle when said confinement is in said expanded condition to restrain movement of the torso and a second portion disposed on an upper side of the axis of rotation of the steering wheel and extending at an angle to said first portion and located in such an orientation relative to the driver as to be spaced apart from the head of the driver when the driver is in an upright position and to be engaged by the head of the driver when the torso of the driver is in a forward position, said confinement when in the expanded condition having a symmetrical configuration with respect to the axis of rotation of the steering wheel and a generally annular cross-sectional configuration in a plane extending through said first and second portions in a direction at right angles to the axis of rotation of the steering wheel whereby said confinement has the same relationship to the driver upon operation of the confinement to the expanded condition with the steering wheel in any one of a plurality of rotational positions relative to the driver of the vehicle, and means for providing a flow of fluid to effect expansion of said confinement from the collapsed condition to the expanded condition.

19. Safety apparatus as set forth in claim 18 wherein said means for providing a flow of fluid includes a source of fluid, said safety apparatus further including axially expandable and contractable conduit means for connecting said source of fluid in fluid communication with said confinement and for enabling relative movement to occur between said confinement and said source of fluid.

20. Safety apparatus as set forth in claim 19 wherein said axially expandable and contractable fluid conduit means includes a first section of conduit operatively connected with said source of fluid and a second section of conduit operatively connected with said confinement, said sections of fluid conduit being disposed in a telescopic relationship with each other.

21. Safety apparatus as set forth in claim 18 wherein said means for providing a flow of fluid includes means for directing the flow of fluid into said confinement to effect expansion of said confinement into engagement with the rim of the steering wheel and then into engagement with the torso of the driver.

22. Safety apparatus for protecting an occupant of a vehicle during a collision, said safety apparatus comprising a confinement having collapsed condition in which said confinement is located on a member in the vehicle and an expanded condition in which said confinement is located between the member and an occupant of the vehicle, said confinement in said expanded condition being effective to restrain movement of an occupant of the vehicle relative to the member during a collision, and means for providing a flow of fluid under pressure to said confinement upon the occurrence of a collision, said means for providing a flow of fluid including a source of fluid and fluid conduit means for connecting said source of fluid in fluid communication with said confinement, said fluid conduit means including flow-directing means for directing the flow of fluid into said confinement to effect expansion of said confinement in a predetermined manner, a first section of fluid conduit connected with said flow-directing means and connected in continuous fluid communication with said confinement through said flow-directing means, a second section of fluid conduit connected continuous fluid communication with said confinement through said first section of fluid conduit and said flow-directing means, and expansion joint means for connecting said first and second sections of fluid conduit in continuous fluid communication and for enabling said first section of fluid conduit to move relative to said second section of fluid conduit upon movement of the member toward said second section of fluid conduit under the influence of forces transmitted from the confinement to the member during a collision.

23. Safety apparatus as set forth in claim 22 wherein said fluid conduit means further includes joint means for enabling said flow directing means to move in a direction transverse to the longitudinal axes of said first and second sections of fluid conduit.

24. Safety apparatus for protecting said driver of a vehicle having a steering wheel, said safety apparatus comprising a confinement mounted adjacent to the steering wheel of the vehicle and having a collapsed condition and an expanded condition in which said confinement engages at least a part of the steering wheel and is located between the steering wheel and the driver, said confinement including a first portion disposed on a lower side of the axis of rotation of the steering wheel for engaging the torso of the driver of the vehicle when said confinement is in said expanded condition to restrain movement of the torso and a second portion disposed on an upper side of the axis of rotation of the steering wheel and extending upwardly away from the driver and located in such an orientation relative to the driver as to be spaced apart from the head of the driver when the driver is in an upright position and to be engaged by the head of the driver when the torso of the driver is in a forward position, and means for providing a flow of fluid to effect expansion of said confinement from the collapsed condition to the expanded condition.

25. Safety apparatus as set forth in claim 24 further including diffuser means for directing a flow of fluid in such a way as to inflate said confinement to a substantially expanded condition before said confinement engages the torso of the driver.

26. Safety apparatus for protecting a driver of a vehicle having a steering wheel with an outer rim adapted to be manually grasped by a driver of the vehicle and a steering column, said safety apparatus comprising a confinement having a collapsed condition and an expanded condition, said confinement in said expanded condition being effective to engage the driver's torso to restrain movement of the driver during a collision, means for supporting said confinement in said collapsed condition adjacent to the steering wheel of the vehicle, and means for providing a flow of fluid to effect expansion of said confinement into engagement with the rim of the steering wheel and then into engagement with the torso of the driver, said last-mentioned means for providing a flow of fluid being supported on the steering column of the vehicle and connected in fluid communication with said confinement by a longitudinally extending passageway formed by a pair of members mounted in a telescopic relationship on the steering column, said members being movable relative to each other to vary their telescopic relationship upon nonrotational movement of the steering wheel relative to a longitudinal axis of the steering column.

27. Safety apparatus for protecting a driver of a vehicle having a steering wheel with an outer rim adapted to be manually grasped by a driver of the vehicle and a steering column, said safety apparatus comprising a confinement having a collapsed condition and an expanded condition, said confinement in said expanded condition being effective to engage the driver's torso to restrain movement of the driver during a collision, means for supporting said confinement in said collapsed condition adjacent to the steering wheel of the vehicle, and means for providing a flow of fluid to effect expansion of said confinement into engagement with the rim of the steering wheel and then into engagement with the torso of the driver, said means for providing a flow of fluid including diffuser means mounted on the steering wheel adjacent to an end portion of a passageway extending along the steering column to a source of fluid under pressure for directing a flow of fluid from said source of fluid under pressure in such a way as to inflate said confinement to a substantially expanded condition before said confinement engages the torso of the driver.